United States Patent [19]

Gonzales

[11] Patent Number: 4,707,564

[45] Date of Patent: Nov. 17, 1987

[54] MESSAGE COVER FOR ELECTRICAL WALL SWITCHES

[76] Inventor: Arturo E. F. Gonzales, 759 E. Washington, Brownsville, Tex. 78520

[21] Appl. No.: 844,506

[22] Filed: Mar. 27, 1986

[51] Int. Cl.$^4$ ............................ H02G 3/14; H05K 5/03
[52] U.S. Cl. ...................................... 174/66; 220/241; 40/10 R; 439/142; 439/135; 439/892
[58] Field of Search .................... 339/36, 44 R, 44 M; 174/66, 67; 220/241, 242; 40/10 R

[56] References Cited

U.S. PATENT DOCUMENTS

| | | | |
|---|---|---|---|
| 1,475,900 | 11/1923 | Thomas | 220/241 |
| 4,381,063 | 4/1983 | Leong | 174/67 |
| 4,451,101 | 5/1984 | Davis | 339/44 R |
| 4,593,486 | 6/1986 | Visocky et al. | 40/10 R |

Primary Examiner—Gil Weidenfeld
Assistant Examiner—Paula A. Austin
Attorney, Agent, or Firm—Neal J. Mosely

[57] ABSTRACT

A message bearing cover for attachment to electrical wall switches comprises a cavitated cover adapted to be releasably attached to an existing electrical wall switch installation and movable from a closed position enclosing the wall switch lever to an open position allowing access to the wall switch lever. The front surface of the cover is adapted to receive and visually display selective messages printed on message tabs. The message tabs are visible when the cover is in the closed position. In one embodiment, the attachment portion of the cover is captured between the wall switch cover plate and the wall surface, and in another embodiment the attachment portion serves as a cover plate which may is mounted to the underlying switch.

12 Claims, 4 Drawing Figures

U.S. Patent  Nov. 17, 1987  4,707,564
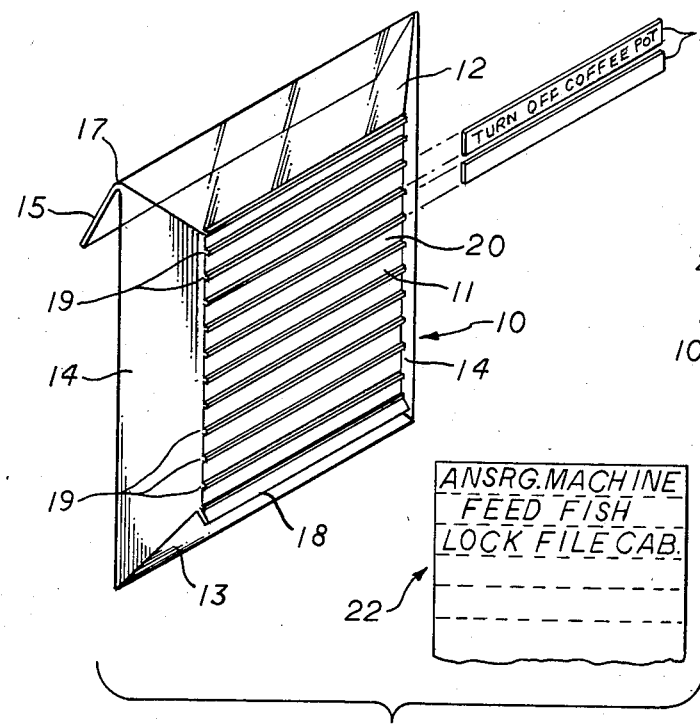
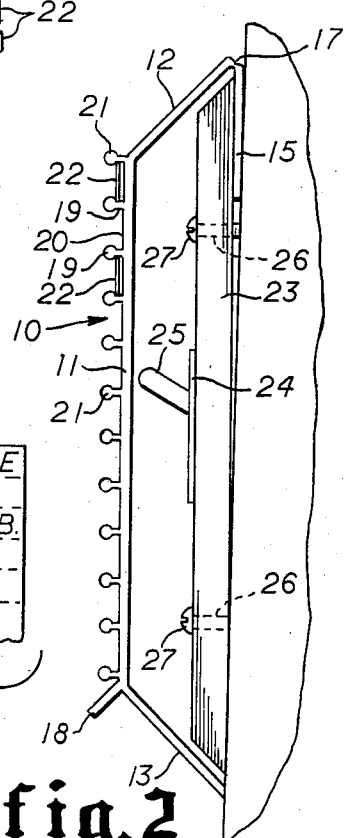
fig.1
fig.2
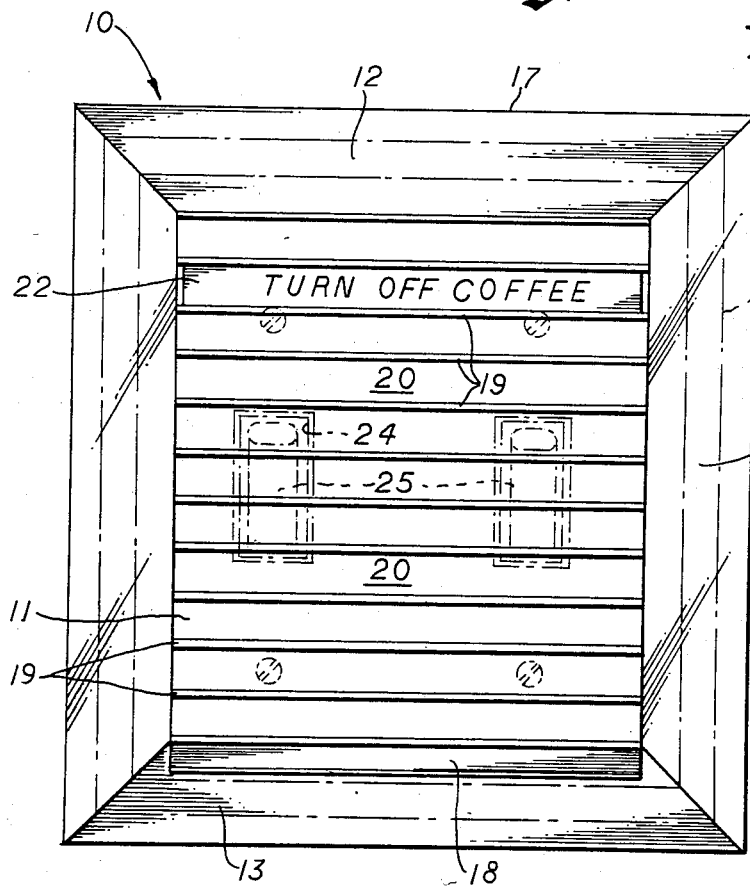
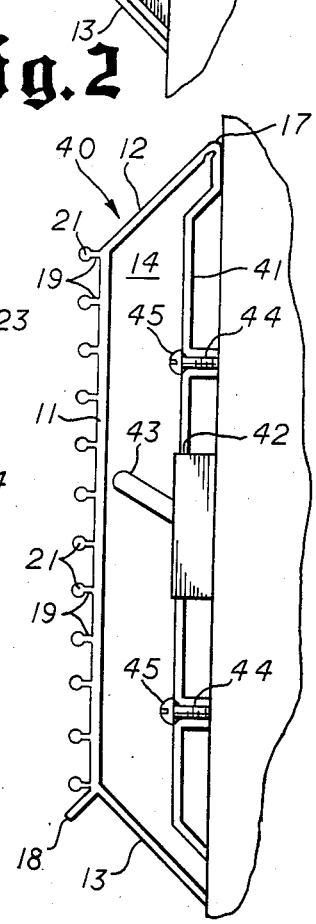
fig.3
fig.4

MESSAGE COVER FOR ELECTRICAL WALL SWITCHES

BACKGROUND OF THE INVENTION

1. Field of the Invention

This invention relates generally to message holding devices, and more particularly to a message cover for electrical wall switch installations which displays selective messages.

2. Brief Description of the Prior Art

Frequently, one will remember too late an important task which should have been done prior to leaving or upon arriving at the home or office, such as; an important appointment, turning off the coffee pot, resetting the answering machine, picking up something on the way, or bringing something home from the office. It would be very useful and desirable to have a relatively reliable means of providing such reminders or messages just prior to leaving or arriving at the home or office.

Message holding devices and switch plate covers are known in the art. There are several patents which disclose various switch plate covers and devices that are attached to switch plates for holding articles.

Anderson, U.S. Pat. No. 2,392,445 discloses a combined wall switch and electric clock comprising a wall switch cover plate with a shelf like support for a small electric clock. The cover plate provides a housing for electrical conductors connecting the clock with the wall switch contacts.

Kinsman, U.S. Pat. No. 2,997,520 discloses a flexible resilient weatherproof cover for an electrical outlet box.

Ramsing, U.S. Pat. Nos. 3,198,373 and 3,204,807 discloses a box-like cover for electrical switch and receptacles having a spring hinge and weatherproof seal.

Rapps. U.S. Pat. No. 4,335,863 discloses a clip-type holding device constructed for attachment to, or replacement of, existing electrical plates. The device is used for holding letters, memo, and other papers.

Bodin, U.S. Pat. No. 4,339,045 discloses another switch plate article holder for holding keys, glasses, and the like which is mounted on a wall switch. The holder includes a plate adapted to be mounted directly to the switch of a wall mounted switch either overlapping the switch plate or including a switch plate portion integral therewith.

Kidd, U.S. Pat. No. D. 115,708 discloses a design for a switch plate cover having a calendar attachment.

Story, U.S. Pat. No. D. 189,351 discloses a design for a wall outlet cover.

The present invention is distinguished over the prior art in general, and these patents in particular by a cavitated message bearing cover which is easily and quickly attached to existing electrical wall switch installations.

SUMMARY OF THE INVENTION

It is therefore an object of the present invention to provide a message cover for electrical wall switches which will display a plurality of selective messages at a convenient location near the entry of a home or office that will be seen upon entering and leaving.

It is another object of this invention to provide a message cover for electrical wall switches which must be physically opened to gain access to the electrical switch.

Another object of this invention to provide a message cover for electrical wall switches whereby various messages may be interchanged from time to time as needed.

A further object of this invention is to provide a message cover for electrical wall switches which can replace the conventional switch plate.

A still further object of this invention is to provide a message cover for electrical wall switches which is attractive, simple in construction, inexpensive to manufacture, and rugged and durable in use.

Other objects of the invention will become apparent from time to time throughout the specification and claims as hereinafter related.

The above noted objects and other objects of the invention are accomplished by the present cavitated message bearing cover which is easily and quickly attached to existing electrical wall switch is easily and quickly attached to existing electrical wall switch installation and is movable between a closed position enclosing the wall switch lever and an open position allowing access to the wall switch lever. The front surface of the cover is adapted to receive and visually display selective messages printed on message tabs which are visible when the cover is in the closed position. In one embodiment, the attached portion of the cover is captured between the wall switch cover plate and the wall surface, and in another embodiment the attachment portion serves as a cover plate which may be mounted to the underlying switch.

BRIEF DESCRIPTION OF THE DRAWINGS

FIG. 1 is an isometric view of a preferred message cover for electrical wall switches.

FIG. 2 is a side view in cross section of the message cover installed on a conventional switch cover plate.

FIG. 3 is a front elevation of the message cover installed on a conventional switch cover plate.

FIG. 4 is a side view in cross section of an alternate message cover having an integral switch plate portion.

DESCRIPTION OF THE PRFERRED EMBODIMENT

Referring to the drawings by numerals of reference, there is shown a preferred message cover 10 for switch plates. The cover 10 is cavitated, generally box-like molded member having a front panel 11 and a contiguous top wall 12, bottom wall 13, and side walls 14, which extend rearwardly and outwardly therefrom. A contiguous rectangular portion or attachment tab 15 is integrally hinged to the back of the top wall 12.

The term "contiguous" as used throughout is intended to mean integrally joined at their mating surfaces, thus the front panel, top wall, bottom wall, side walls, and attachment tab are all joined together in the molding operation to form an integral unit.

The attachment tab 15 is an extension of the top wall 12 and a hinge 17 is formed at the juncture of the rectangular tab portion with the top wall. The hinge 17 is commonly referred to in the plastics field as a "living hinge." The hinge 17 allows pivotal movement between the attachment tab 15 and the remainder of the cover.

A rectangular lift tab 18 integral with the front plate 12 extends along the juncture of front plate with the bottom wall 13 and protrudes outwardly and downwardly a short distance therefrom.

A series of longitudinally spaced protuberance or ribs 19 are formed on the front plate 12 to extend transversely thereacross. The ribs 19 are raised slightly above the surface of the front plate to define a series of depressions or wide slots 20 and each may have small rounded end 21.

A series of flat planar message tabs 22 may be provided with the cover 10. The message tabs 22 are of a size and shape to be slidably and removably received within the slots 20 and are prevented from accidentally being dislodged by the rounded end of the ribs 19.

The message tabs 22 may comprise a set of blank tabs whereby the user may write any appropriate messages as needed and a plurality of other tabs bearing preprinted commonly used messages. Various commercially available message tabs may also be used with the cover, such as; plastic or paper labels having an adhesive backing, or plastic labels of the type which allow letters to be impressed into the surface by a small hand held stamping device.

It should be understood that the rib and slot detail described above represents one example of providing a message receiving means on the front panel of the cover, and that other message receiving means may be incorporated without departing from the scope of the invention.

FIGS. 2 and 3 illustrate the message cover 10 installed on a conventional electrical wall switch installation having a substantially standard switch plate 23. The switch plate 23 is illustrated as a substantially standard type plate for a single or double wall mounted electrical switch typically located adjacent the doorway of offices or the room of a dwelling. The switch plate 23 has at least one aperture or slot 24 through which the switch lever 25 extends and at least one pair of holes 28 through which the mounting screws 27 for the switch plate extend to be threadedly received in the underlying switch.

To install the message cover 10, the top mounting screw 27 is loosened and the attachment tab 15 is inserted between the back of the switch plate 23. The cover is pivoted up to the open position and the top mounting screw 27 is tightened to capture the attachment tab 15 between the back of the switch plate 23 and the wall surface.

FIG. 4 illustrates an alternate message cover 40 having an integral switch plate portion 41. In this modification, the switch plate portion 41 is similar to the previously described attachment tab. The same numerals of reference are used to designate identical parts previously described.

The cover 40 is a cavitated, generally box-like molded member having a front panel 11 and a contiguous top wall 12, bottom wall 13, and side walls 14, which extend rearwardly and outwardly therefrom. A contiguous, generally rectangular switch plate portion 41 is integrally hinged to the back of the top wall 12.

The switch plate portion 41 is an extension of the top wall 12 and a hinge 17 is formed at the juncture of the switch plate portion with the top wall. The hinge 17 is commonly referred to in the plastics field as a "living hinge." The hinge 17 allows pivotal movement between the switch plate portion 41 and the remainder of the cover.

The switch plate portion 41 is illustrated as a substantially standard type plate for a single or double wall mounted electrical switch typically located adjacent the doorway of offices of the room of a dwelling. The switch plate portion 41 has at least one aperture or slot 42 through which the switch lever 43 extends and at least one pair of holes 44 through which the mounting scres 45 for the switch plate extend to be threadedly receiving in the underlying switch.

A rectangular lift tab 18 integral with the front plate 12 extends along the juncture of front plate with the bottom wall 13 and protrudes outwardly and downwardly a short distance therefrom.

A series of longitudinally spaced protuberances or ribs 19 are formed on the front plate 12 to extend transversely thereacross. The ribs 19 are raised slightly above the surface of the front plate to define series of depressions or wide slots 20 and each may have a small rounded end 21.

Different styles and shapes of switches and plates are known and the present invention can be adapted to fit such switches or plates.

With the message cover 10 or 40 installed as described above, the user may select an appropriate message from the series of message tabs 22 provided with the cover 10, or write the appropriate message on a blank tab. The user slides the message tabs 22 into the slots 20. The message cover serves as a convenient reminder which will be seen upon arriving or leaving because the user must first lift the cover to gain access to the light switch in order to turn the lights on or off.

While this invention has been described fully and completely with special emphasis upon several preferred embodiments, it should be understood that within the scope of the appended claims the invention may be practiced otherwise than as specifically described herein.

I claim:

1. A message bearing cover for attachment to interior electrical wall switches comprising;
    a cavitated cover adapted to be releasably attached to an existing interior electrical wall switch installation at a convenient location for visibility within a dwelling and movable from a closed position enclosing the wall switch lever to an open position allowing access to the wall switch lever, and
    the outer surface of said cavitated cover configured to removably receive and visually display selective printed messages when said cover is in the closed position.

2. A message bearing cover according to claim 1 in which
    said cover is integrally and flexibly connected to a cover plate fitting said switch installation.

3. A message bearing cover according to claim 1 in which
    said cover is integrally and pivotally connected to a cover plate fitting said switch installation.

4. A message bearing cover according to claim 1 including
    lifting means integral with said cover for manually moving said cover between the closed position and the open position.

5. A message bearing cover according to claim 4 in which
    said lifting means comprises a rectangular tab extending outwardly from the front surface of said cover.

6. A message bearing cover according to claim 1 including
    message means adapted to be received on the outer surface of said cover to be visually displayed when said cover is in the closed position.

7. A message bearing cover according to claim 6 in which said message means comprises a plurality of flat planar tabs, and the outer surface of said cavitated cover provided with a series of longitudinally spaced slots of the front surface of said cover of size and shape to slidably receive said flat planar tabs.

8. A message bearing cover according to claim 6 in which said message means comprises a plurality of flat planar tabs, some of which having selected messages printed thereon and some of which are blank to receive messages printed thereon by the user.

9. A message bearing cover according to claim 1 in which said cover comprising a generally box-like molded member having a front panel and contiguous rearwardly extending top, bottom, and side walls, an attachment portion integrally hinged thereto and extending therefrom for pivotal movement relative thereto, said front panel and top, bottom, side walls, and said attachment portion forming an integral unit, and said attachment portion adapted to be removably secured to the interior switch installation.

10. A message bearing cover according to claim 9 in which the outer surface of said cavitated cover provided with a series of longitudinally spaced protuberances extending transversely across said front panel.

11. A message bearing cover according to claim 9 in which said attachment portion comprises a generally rectangular extension of said top wall of size and shape to be slidably received and captured between the back the existing cover plate of the wall switch installation and the wall surface.

12. A message bearing cover according to claim 9 in which said attachment portion comprises a generally rectangular extension of said top wall having at least one aperture through which the existing switch lever extends and at least one pair of holes through which mounting screws extend to be threadedly received in the underlying switch.

* * * * *